United States Patent Office 3,154,380
Patented Oct. 27, 1964

3,154,380
PROCESS FOR THE MANUFACTURE OF AMMONIUM PERCHLORATE AND SODIUM AMMONIUM PHOSPHATE
Hideo Arita, Tokyo, Japan, assignor to Asahi Kasei Kogyo Kabushiki Kaisha, Osaka, Japan, a corporation of Japan
No Drawing. Filed Oct. 5, 1961, Ser. No. 143,037
3 Claims. (Cl. 23—85)

This invention relates to a process for the manufacture of ammonium perchlorate and sodium ammonium phosphate from sodium perchlorate solution. Ammonium perchlorate is ordinarily prepared by a reaction of an aqueous solution of sodium perchlorate with ammonium chloride or ammonium sulphate. This reaction, however, does not go to completion so that the sodium perchlorate remains unreacted in the solution with the other salts. Accordingly the complete recovery of sodium perchlorate is not easy. Ammonium perchlorate has also been produced by a reaction of an aqueous solution of sodium perchlorate with ammonia and a 35% hydrochloric acid solution at elevated temperature, concentration of the reaction mixture solution obtained in a vacuum crystallizer in which ammonium perchlorate is initially precipitated and separated, concentration and subsequent separation of sodium chloride from the concentrated solution. This process permits an efficient use of sodium perchlorate, but accompanies many disadvantages. For instance, apparatus are greatly corroded due to the fact that the operations are carried out at elevated temperature and the solutions to be treated is acidic. Sodium chloride of little commercial value is produced as a by-product from more costly hydrochloric acid. Moreover, it is not easy to separate said sodium chloride.

It is an object of the present invention to provide a process for the alternative manufacture of ammonium perchlorate and sodium ammonium phosphate in commercial scale.

It is another object of the present invention to provide a method to obtain ammonium perchlorate and phosphate in about 100% recovery.

It is a further object of the present process to obtain ammonium perchlorate in high yield by double decomposition of sodium perchlorate and moreover to recover sodium in the raw material (sodium perchlorate) in the form of phosphate of $NaNH_4HPO_4$ which is useful for an antiphlogistic agent and also as a purifier of boiler water after being mixed with sodium hydroxide.

According to the present invention, ammonium perchlorate is first prepared by the addition of ammonia and phosphoric acid to an aqueous sodium perchlorate solution. The reaction takes place in accordance with the following equation:

$$NaClO_4 + NH_3 + H_3PO_4 \rightarrow NH_4ClO_4 + NaH_2PO_4 \quad (1)$$

Ammonium perchlorate precipitates as a solid while sodium dihydrogen phosphate ($NaH_2PO_4$) remains in solution. It is preferable to make the solution acidic in order to leave $NaH_2PO_4$ in the solution. The reaction solution is adjusted to a pH from 3.5 to 6.8, preferably from 4 to 6. It is not essential for the reaction to raise the temperature. A temperature between 15° C. and 35° C. is used economically.

In the secondary step, ammonia is absorbed into the filtrate containing $NaH_2PO_4$ after separation of the above ammonium perchlorate out of the solution. The reaction takes place according to the following equation:

$$NaH_2PO_4 + 4H_2O + NH_3 \rightarrow NaNH_4HPO_4 \cdot 4H_2O \quad (2)$$

In order to facilitate the reaction (2), it is preferable to make the system alkaline or neutral. The composition of the phosphate is varied depending on the concentration of ammonia to be added, but $$NaNH_4HPO_4 \cdot 4H_2O$$

is typical and predominant. The proper range of pH is between 7.5 and 9.5, especially between 8 and 9.

Both reactions (1) and (2) may take place at nearly the same temperature, because the regulation of pH in each reaction enables to separate completely the ammonium perchlorate and the phosphate. However, it is preferable that the temperature at which the separation of sodium ammonium phosphate is conducted is from 5 to 10° C. higher than the separation temperature of ammonium perchlorate. This fact is one of the great advantages in the present process. The mother liquor after separating the phosphate in the reaction (2) may be returned to the reactions (1) and (2). Accordingly, the yields of both the ammonium perchlorate and the phosphate could be theoretically 100% by repeating the reactions.

According to the present process concentration by evaporation of the mother liquor is rarely necessary because water in the mother liquor is removed from the system in the form of water of crystallization of the phosphate. When the raw materials of sodium perchlorate and phosphoric acid contain a lot of water, the concentration of the mother liquor may be necessary. Even in such a case, corrosion of apparatus for the concentration is avoided because the concentration takes place in neutral or alkaline condition.

The details of the process will be better understood from a consideration of the following experimental data, which are given merely for the sake of illustration.

*Example 1*

83 g. of ammonia and 660 g. of sodium perchlorate (containing one molecule water of crystallization) were dissolved in 1000 g. of water with stirring and further 720 g. of 65% phosphoric acid were added until pH of the resulting solution was 3.8. The solution was cooled to 25° C. The precipitated ammonium perchlorate was filtered off and washed with 60 g. of water. The washed water was mixed with the mother liquor. Recovered ammonium perchlorate was substantially pure. Yield: 290 g. as pure ammonium perchlorate. The pH of the mother liquor was made 8.5 by absorbing 76 g. of ammonia into the mother liquor after separation of ammonium perchlorate, thereby a substantial amount of crystalline phosphate were precipitated. The solution was cooled to 30° C., filtered and the precipitate was washed with 100 g. of water. The washed water was mixed with the mother liquor. The separated phosphate was crystal of $NaNH_4HPO_4 \cdot 4H_2O$ and contained 770 g. of pure crystal.

*Example 2*

Into the mother liquor of Example 1 after separating phosphate, 32 g. of ammonia and 420 g. of 65% phosphoric acid were added until pH was 4.0. While it was hot, 400 g. of sodium perchlorate were added to the solution with stirring, and sodium perchlorate was dissolved while, at the same time, crystals of ammonium perchlorate precipitated. The solution was cooled to 30° C. and filtered. The precipitate was washed with 60 g. of water. The washed water was mixed with the mother liquor. The recovered ammonium perchlorate (or salt) was substantially pure perchlorate. Yield: 300 g. as pure ammonium perchlorate. The pH of the mother liquor was made 9.2 by adding 84 g. of ammonia after separating of the ammonium perchlorate until a large quantity of crystal phosphate was precipitated. The solution was cooled to 30° C. and was filtered. The precipitate was washed with 100 g. of water. The separated precipitate of the phosphate amounted to 560 g. and the composition was 33.7% of $P_2O_5$ and 9.8% of $NH_3$, others being Na and water of crystallization.

What I claim is:

1. A continuous process for the preparation of ammonium perchlorate and sodium ammonium phosphate in two distinct stages which comprises dissolving ammonia and phosphoric acid in an aqueous solution of sodium perchlorate, adjusting the solution obtained to a pH between 3.5 and 6.8, to form in a first stage a precipitate of ammonium perchlorate in a mother liquor, separating at room temperature the ammonium perchlorate thus formed, adding ammonia to the mother liquor until the pH is between 7.5 and 9.5 to precipitate sodium ammonium phosphate all alone in a second stage and recovering the phosphate.

2. A process according to claim 1 wherein the temperature at which the separation of the phosphate is conducted is from 5° to 10° C. higher than the temperature at which the ammonium perchlorate is separated.

3. A process as claimed in claim 1 comprising recycling the liquor remaining subsequent to the separation of the phosphate by adding the ammonia and phosphoric acid thereto and then introducing sodium perchlorate thereto.

References Cited in the file of this patent

UNITED STATES PATENTS

| | | |
|---|---|---|
| 1,020,293 | Klingbiel | Mar. 12, 1912 |
| 1,036,896 | Peacock | Aug. 27, 1912 |
| 2,739,873 | Schumacher | Mar. 27, 1956 |

FOREIGN PATENTS

| | | |
|---|---|---|
| 300,903 | Great Britain | Oct. 24, 1929 |